Patented June 14, 1932

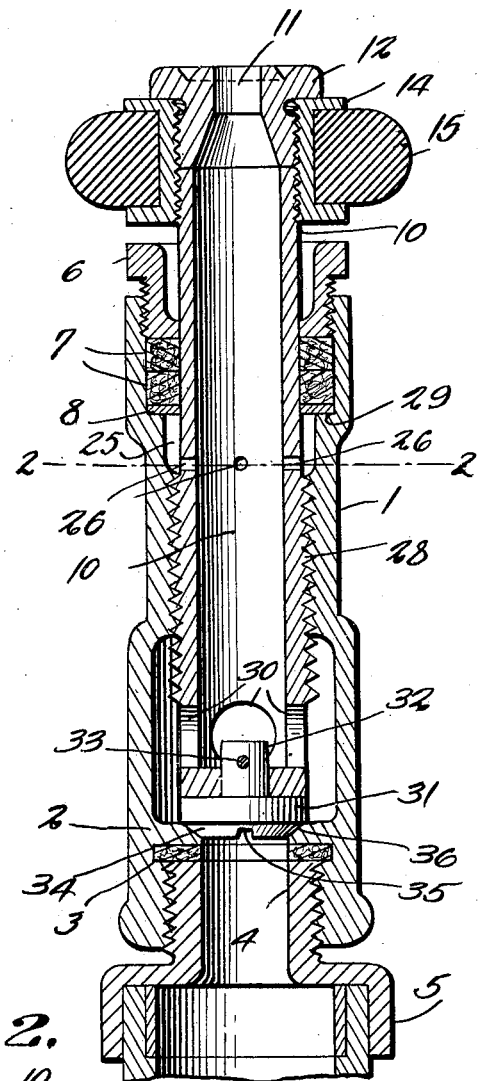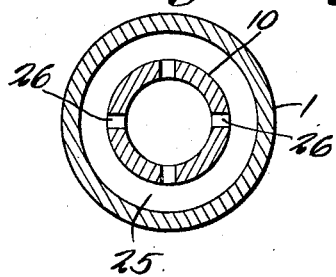

1,862,957

UNITED STATES PATENT OFFICE

JORDAN W. GRANT, OF PORTSMOUTH, VIRGINIA

NOZZLE

Application filed June 13, 1930. Serial No. 461,019.

One object of this invention is to provide novel means for attaching a handgrip and a nozzle tip to the outlet tube of a hose nozzle through the instrumentality of a single part which is constructed to hold the handgrip, and engage both the nozzle tip and the tube detachably. Another object of the invention is to provide, in a hose nozzle having a longitudinally movable outlet tube, means whereby the packing may be held about the tube lightly at the start, whilst the tube is being adjusted longitudinally, and then with an increased pressure as the fluid pressure in the outlet tube builds up. Another object of the invention is to check the kick by providing means for preventing letting the air too rapidly out of the hose which carries the nozzle, at the start, and to prevent kick in the hose, due to shutting off the flow of liquid too quickly.

In the accompanying drawing:

Figure 1 is a longitudinal section;

Figure 2 is a cross section on the line 2—2 of Figure 1.

Referring to Figures 1 and 2, the nozzle is shown as comprising a tubular body 1 provided with an internal seat 2 against which abuts a washer 3 adapted to be engaged by the reduced end 4 of a hose coupling 5, of any desired sort, the end 4 of the coupling 5 being threaded in the body 1, or mounted otherwise therein.

A packing nut 6 is threaded into the forward end of the body 1, and resilient packing rings 7 are located inwardly of the nut 6 within the body 1. The innermost packing ring 7 cooperates with a metal washer 8.

An outlet tube 10 is slidable in the packing nut 6, in the packing rings 7, and in the washer 8. A replaceable nozzle tip 11 is threaded or secured otherwise in a channel ring 14, and is provided in its outer end with a laterally extended flange 12. The channel ring 14 is threaded or secured otherwise on the outlet tube 10, in abutment with the flange 12. An annular grip 15, preferably made of rubber or similar material, is mounted in the channel ring 14 and may be snapped into place, within the channel ring.

An annular chamber 25 is shaped to fit in the body 1, about the outlet tube 10, immediately to the rear of washer 8 and ports 26 in the tube establish communication between the bore of the tube 10 and the chamber 25.

The outlet tube 10 is threaded at 28 into the body 1. The body 1 has a shoulder 29 against which the washer 8 abuts, and against which the packing rings 7 are pressed, by the action of the packing nut 6, to create a fixed pressure on the rings 7, and to cause the rings 7 to grip the outlet tube 10 with a predetermined hold.

In the inner end of the outlet tube 10 there are openings 30, which communicate with the butt end of the body 1.

A valve disc 31 forms the head of a securing element 32 mounted in the inner end of the outlet tube 10 and held in place by a cross pin 33, or in any desired way. The head or valve disc 31 has a tapered foot 34 corresponding in shape to a recess 36 in the seat 2. The foot 34 has a kerf 35, into which a screw driver or similar tool may be inserted for the purpose of rotating the securing element 32 and the foot 34, to grind the foot.

The nozzle is opened by rotating the outlet tube 10 to space the part 34 from the wall of the recess 36, the outlet tube 10 being threaded at 28 into the body 1. The liquid from the hose coupling 5 flows into the butt end of the body 1, through the openings 30 in the outlet tube 10, and out of the mouth 11 of the outlet tube. The liquid under pressure passes through the ports 26 into the chamber 25 and exerts a pressure against the metallic ring 8, the packing 7 being additionally compressed to enhance its grip about the outlet tube 10, when the nozzle is opened.

Because the outlet tube 10 is threaded at 28 into the body 1, the nozzle cannot be opened quickly. The air in the hose is held back, and the liquid does not arrive at the nozzle with a bang or kick. The construction also prevents shutting off the liquid too quickly, with a corresponding lateral bursting or straining kick in the hose.

Having thus described the invention, what is claimed is:

A nozzle comprising a body having a seat, an outlet tube carrying a valve cooperating with the seat to govern the flow of liquid through the outlet tube, the outlet tube being threaded into the body, thereby enabling and compelling the operator to open the valve so slowly that the air in the hose, behind the nozzle, will flow gradually through the nozzle, check the forward flow of liquid, and prevent the liquid from arriving at the nozzle with an impact of objectionable force, the threading of the nozzle into the body enabling and compelling the operator to close the valve so slowly that no objectionable bursting pressure will be created in the hose, behind the nozzle, the nozzle being characterized by the provision of means whereby the outlet tube is packed lightly when the valve is closed, thereby enabling the operator to move the outlet tube with a light and easily regulated effort, said means comprising a packing washer within the body, about the outlet tube, and abutting against a shoulder in the body, and a nut threaded into the forward end of the body, and exerting an adjusted but continuing pressure on the washer; the nozzle being further characterized by the provision of means whereby, after the occasion for the adjustment of the inlet tube by an operator has passed, the packing may be compressed more tightly about the inlet tube, to avoid leakage under working pressure, the last-specified means embodying an annular chamber in the body, behind the washer, which admits pressure upon the washer and compresses it beyond the pressure afforded by the said nut, and there being, in the outlet tube, at least one port which admits pressure to the chamber, from the interior of the nozzle, and said port being small enough so as to cause no swirl or practical variation in the flow of liquid through the outlet tube.

In testimony that I claim the foregoing as my own, I have hereto affixed my signature.

JORDAN W. GRANT.